United States Patent [19]

Abe

[11] Patent Number: 5,201,400

[45] Date of Patent: Apr. 13, 1993

[54] APPARATUS FOR CONVEYING ROLL-SHAPED ARTICLE

[75] Inventor: Etsurou Abe, Aichi, Japan

[73] Assignee: Isowa Industry Co., Ltd., Aichi, Japan

[21] Appl. No.: 825,223

[22] Filed: Jan. 24, 1992

[30] Foreign Application Priority Data

Jan. 25, 1991 [JP] Japan ................................. 3-007629

[51] Int. Cl.$^5$ ............................................ B65G 47/34
[52] U.S. Cl. .................................. 198/463.3; 198/777
[58] Field of Search ...................... 198/777, 463.3, 592; 193/35 S

[56] References Cited

U.S. PATENT DOCUMENTS

| 1,753,679 | 4/1930 | Barrett | 198/777 X |
| 4,361,223 | 11/1982 | Johnson | 198/777 X |
| 5,064,046 | 11/1991 | Janotik et al. | 198/592 X |

FOREIGN PATENT DOCUMENTS 0905164 2/1982 U.S.S.R. ................... 198/777

Primary Examiner—Robert P. Olszewski
Assistant Examiner—Cheryl L. Gastineau
Attorney, Agent, or Firm—Cushman, Darby & Cushman

[57] ABSTRACT

An apparatus for conveying a roll such as a paper web roll set on the roll stand of a corrugator to a predetermined location at low speed, with a small initial force and without scratches or other damage to the roll. The apparatus includes a plurality of flat plate-shaped bases arranged end-to-end in the direction in which the roll is conveyed, a plurality of fulcrum shafts each passing through shaft holes in a corresponding base to allow each base to pivot on its shaft, raising and lowering units beneath each base to raise and lower the base, a load sensing unit below the downstream side of each base to detect a load exerted on the base, and a controller responsive to a signal from the load sensing unit to control raising and lowering units at a subsequent stage. When the bases are assembled together with the fulcrum shafts, a conveyance path for conveying the roll to the predetermined final location at low speed and without any acceleration is formed.

20 Claims, 4 Drawing Sheets

APPARATUS FOR CONVEYING ROLL-SHAPED ARTICLE

BACKGROUND OF THE INVENTION (a) Field of the Invention

The present invention relates generally to an apparatus for conveying a roll-shaped article. More particularly, the present invention relates to an apparatus for slowly and safely conveying a paper web roll used in a cardboard manufacturing plant or the like without any acceleration while it is rotationally displaced.

(b) Description of the Related Art

A conventional double-sided cardboard is usually produced in a laminated structure having three layers such that liners are adhesively secured to opposite surfaces of a corrugated core. In addition, a double-sided cardboard including two corrugated cores (exhibiting a laminated structure having five layers) or a twin double-sided cardboard including three corrugated cores (exhibiting a laminated structure having seven layers) is practically used depending on an application field of the cardboard. To produce each of the cardboards, a roll-shaped paper web for corrugated cores and an odd number of roll-shaped paper webs, i.e., three, five or seven roll-shaped paper webs for liners, are set on a so-called corrugator, i.e., an apparatus for producing cardboards. Additionally, operations for exchanging used roll-shaped paper webs with replacement rolls, production of each cardboard to be produced is often performed many per day, and conveyance of roll-shaped paper webs in a warehouse as well as replacement of roll-shaped paper webs are manually conducted by an operator each time an exchanging operation is performed. Some roll shaped paper webs to be set on a roll stand of the corrugator are heavily dimensioned to have a width of 240 cm and a weight of 2000 kg. For this reason, great strength is required by an operator to rotationally convey each roll-shaped paper web on the floor surface This means that a conveying operation is performed with much danger. When foreign materials are present on the floor surface, there is a possibility that a roll-shaped paper web will accidentally be damaged by such foreign matter.

SUMMARY OF THE INVENTION

The present invention has been made with the foregoing background in mind.

An object of the present invention is to provide an apparatus for conveying a roll-shaped article wherein the apparatus assures that the roll-shaped article can slowly be conveyed with a low initial force given thereto while it is rotationally displaced.

Another object of the present invention is to provide an apparatus for conveying a roll-shaped article wherein the apparatus assures that the roll-shaped article can reliably and safely be conveyed without any injury or scratch caused thereon while it is rotationally displaced.

According to one aspect of the present invention, there is provided an apparatus for conveying a roll-shaped article wherein the apparatus comprises a plurality of bases successively arranged in an end-to-end relationship in the conveying direction of the roll-shaped article, each of the bases being constructed so that it includes a projection on the downstream side and a recess on the upstream side thereof adapted to loosely receive the projection of an adjacent base, an upper smooth surface of each base extends substantially parallel to a bottom surface of the base, and shaft holes each serving as a fulcrum shaft hole are provided below the base or through the base, the bases being successively assembled together to build a conveyance passage for conveying the roll-shaped article. A plurality of fulcrum shaft transversely arranged corresponding to the bases so as to allow each base to be pivoted to turn about the corresponding fulcrum shafts inserted through the shaft holes, the fulcrum shafts serving for successively assembling the bases to build the conveyance passage; raising and lowering unit disposed below each base to raise and lower the base, respectively; a load sensing unit disposed below the downstream side of each base; and a controller adapted to be activated in response to a signal generated by the load sensing unit to perform a controlling operation in such a manner that raising and lowering units disposed below the base at the subsequent base are actuated.

It is preferable that each of the raising and lowering units comprises a fluid pressure actuating cylinder such as a pneumatic cylinder or the like.

Usually, the load sensing unit comprises a switch and an actuator for actuating the switch.

According to another aspect of the present invention, there is provided an apparatus for conveying a roll-shaped article wherein the apparatus comprises a plurality of flat plate-shaped bases successively arranged in an end-to-end relationship in the conveying direction of the roll-shaped article, each of the bases being constructed so that it includes a projection on the downstream side and a recess on the upstream side thereof adapted to loosely receive the projection of an adjacent base, an upper smooth surface of each base extends in substantial parallel with a bottom surface of the base, and shaft holes each serving as a fulcrum shaft hole is formed through the substantially central part of the base, the bases being successively assembled together to build a conveyance passage for conveying the roll-shaped article; a plurality of fulcrum shafts transversely arranged corresponding to the bases so as to allow each base to be pivoted to turn about the corresponding fulcrum shaft inserted through the shaft holes, the fulcrum shafts serving for successively assembling the bases to build the conveyance passage; raising and lowering units disposed below the base, respectively to raise and lower the base; a load sensing unit disposed below the downstream side of each base; and a controller adapted to be activated in response to a signal generated by the load sensing unit to perform a controlling operation in such a manner that raising and lowering units disposed below the upstream side of a base at the subsequent stage are actuated.

Other objects, features and advantages of the present invention will become apparent from reading of the following description which has been made in conjunction with the accompanying drawings.

BRIEF DESCRIPTION OF THE DRAWINGS

The present invention is illustrated in the following drawings in which.

DESCRIPTION OF THE PREFERRED EMBODIMENTS

Now, the present invention will be described in detail hereinafter with reference to the accompanying drawings which illustrate preferred embodiments of the present invention.

Figure 3:
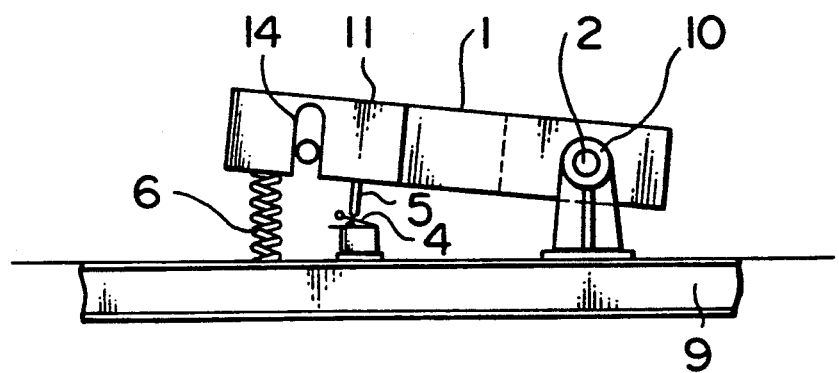
FIG. 3 is an enlarged side view of a single base for the apparatus shown in FIG. 1.
Figure 4:
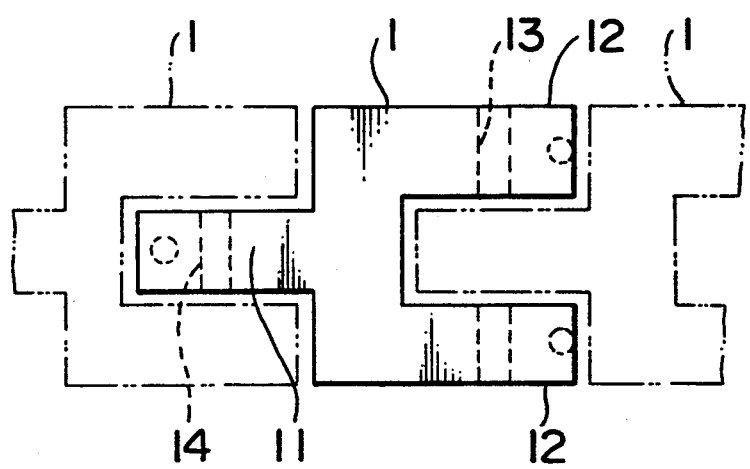
FIG. 4 is a plan view of the base shown in FIG. 3.

FIG. 3 and FIG. 4 show a single base 1 for the conveying apparatus in accordance with a first embodiment of the present invention, respectively, wherein FIG. 3 is a side view of the base 1 and FIG. 4 is a plan view of the same. Each base 1 is constructed in a flat plate-shaped configuration using a suitable material such as a steel plate or the like so that an upper smooth surface extends substantially parallel a bottom surface of the base. It is desirable that the base 1 is dimensioned to have a width larger than that of a roll-shaped article 3 (hereinafter referred to simply as a roll) to be conveyed by the apparatus. The base 1 includes a bifurcated portion 12 on the upstream side and a projection 11 on the downstream side thereof. As is best seen in FIG. 4, the projection 11 extends along the center line of the conveying apparatus and is loosely fitted into the bifurcated portion 12 without any close contact therebetween. The shaft holes 13 is formed at the central positions of the bifurcated portion 12 or at the positions downstream of the base 1 so as to allow a fulcrum shaft 2 to extend through the shaft holes 13. In addition, the projection 11 is formed with a downward oriented slot (or an elongated hole) 14 at the position corresponding to the positions of the shaft holes 13 in order to ensure that the base 1 assumes the necessary inclination for conveying a roll-shaped article with the force of gravity.

Figure 1:
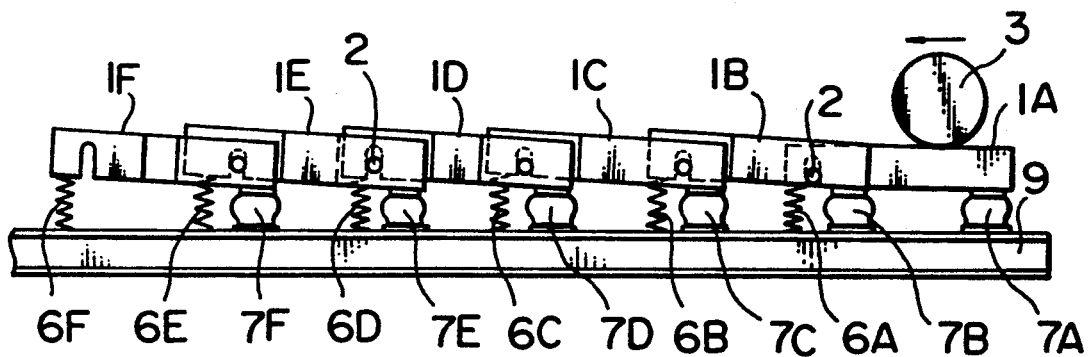
FIG. 1 is a side view which schematically illustrates the structure of an apparatus for conveying a roll-shaped article in accordance with a first embodiment of the present invention.
Figure 2:
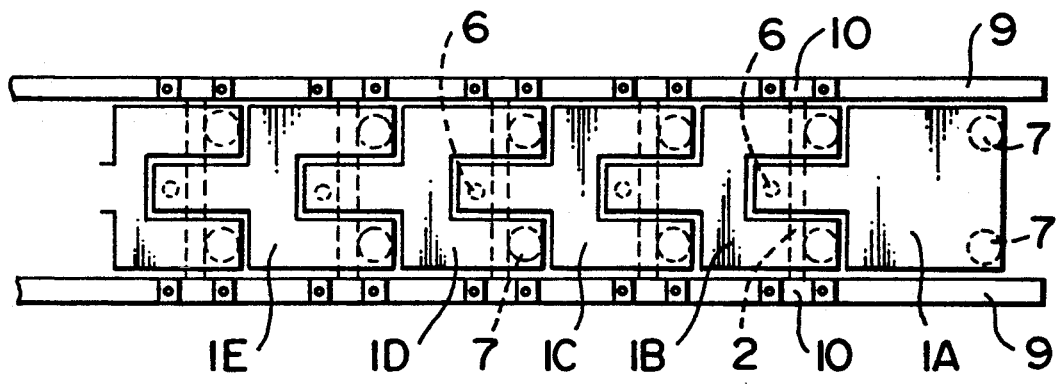
FIG. 2 is a plan view of the apparatus shown in FIG. 1.

As shown in FIG. 1, it is desirable that a base 1A to be initially loaded with the roll 3 is designed in the form of a horizontally extending flat plate including no bifurcated portion but having necessary dimensions and a base (not shown) arranged at the extreme end of a conveyance passage of the apparatus is likewise designed in the form of a horizontally extending flat plate including no projection but having necessary dimensions.

The fulcrum shaft 2 extending through the shaft holes 13 of the base 1 in the transverse direction is supported by an opposing pair of bearings 10 on a foundation frame 9 placed on a floor surface or the like. In addition, a fulcrum shaft 2 on the subsequent stage is loosely fitted into the slot 14. As is best seen in FIG. 3, the base 1 is pivoted to turn about the fulcrum shaft 2 with a slightly raised attitude on the downstream side. A necessary number of bases each constructed in the above-described manner are successively joined to each other in an end-to-end relationship to build a conveyance passage for conveying the roll 3.

With respect to the base 1A at the first stage, two raising and lowering units 7 each designed in the form of an air bag, a pneumatic cylinder or the like are disposed below the bifurcated portion 12 of the base 1A on the upstream side of the apparatus.

With respect to bases other than the base 1A, the raising and lowering units 7 are disposed below the upstream side of each base. As desired, a coil spring 6 is disposed at the position below the base 1 opposite raising and lowering units 7. In addition, an actuator 5 for actuating a switch 4 is attached to the lower surface of the projection 11 of the base 1, and a load sensing unit is constituted by the switch 4 and actuator 5.

Figure 5:
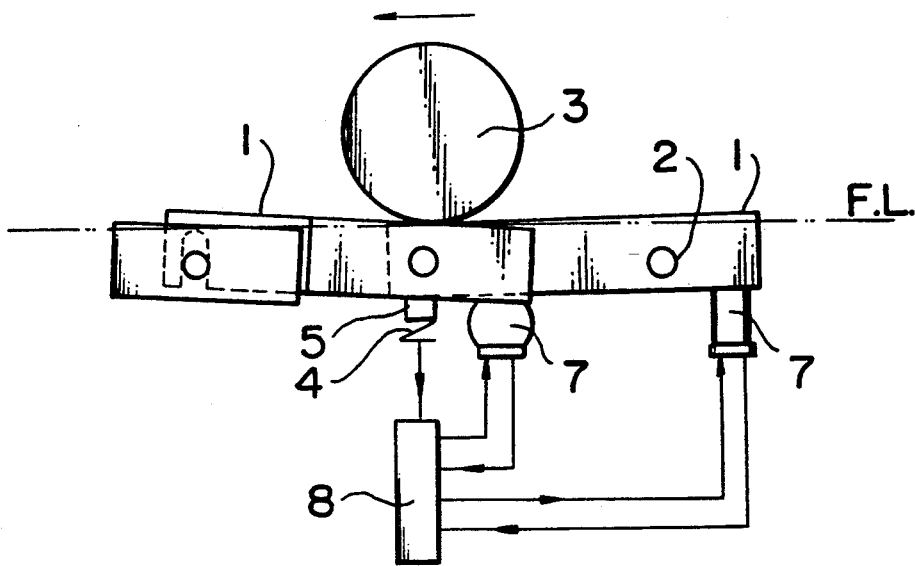
FIG. 5 is a fragmentary side view of the apparatus shown in FIG. 1, particularly illustrating rotational displacement of the roll-shaped article on a series of bases.
Figure 6:
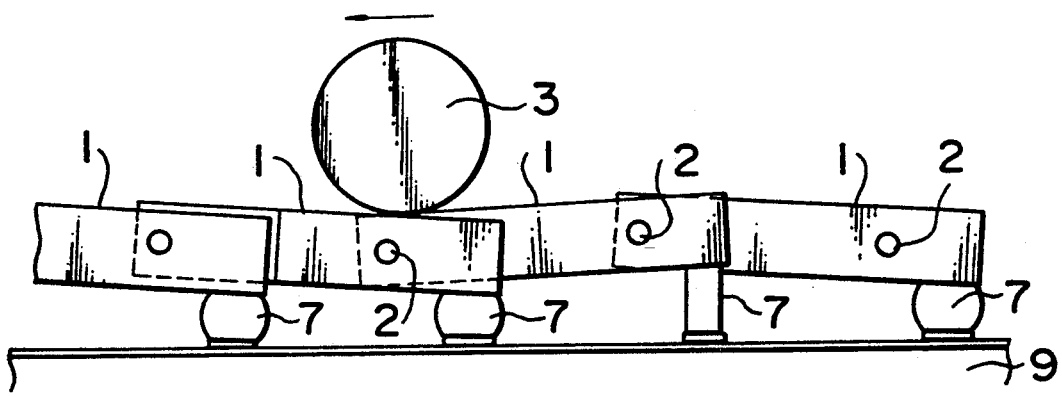
FIG. 6 is a fragmentary side view of the apparatus shown in FIG. 1, particularly illustrating the operational relationship between rotational displacement of the roll-shaped article and turnable displacement of each base.

In response to a signal transmitted from the load sensing unit, the raising and lowering units 7 are driven via a controller 8 (see FIG. 5) so as to lower the projection 11 or raise up the bifurcated portion 12 at the subsequent stage to downwardly incline the base 1 as seen in the conveying direction of the roll 3. Thereafter, the raising and lowering units 7 at the present stage are driven so as to allow the base 1 to assume a normal inclined attitude.

Next, a base for the apparatus in accordance with a second embodiment of the present invention as well as a base for the same in accordance with a third embodiment of the present invention will be described below with reference to FIG. 7A and FIG. 7B.

Figure 7A:
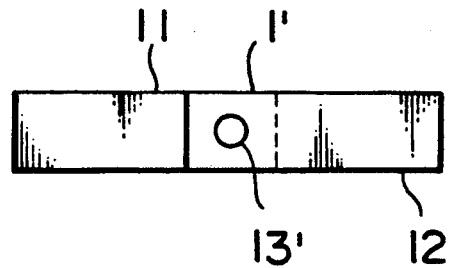
FIG. 7A is a side view of a single base for the apparatus in accordance with a second embodiment of the present invention.

Referring to FIG. 7A, according to the second embodiment of the present invention, a shaft hole 13' is formed at the substantially central part of the base 1' between the projection 11 and the bifurcated portion 12. With this construction, in contrast to the first embodiment of the present invention, there is no need to form the slot 14 on the projection 11. The raising and lowering units 7 may be disposed either below the projection 11 or below the bifurcated portion 12 in the same manner as in the first embodiment of the present invention. However, each raising and lowering unit 7 is operated in a manner different from the first embodiment of the invention, as described below. It should be noted that when each raising and lowering unit 7 is provided with upper and lower limit stoppers, there is no need to provide a spring corresponding to coil spring 6 in the first embodiment of the invention.

Figure 7B:
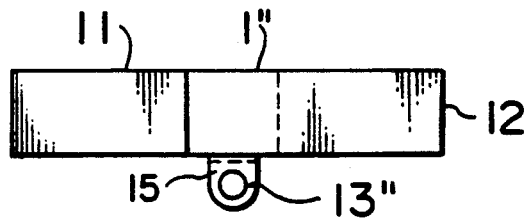
FIG. 7B is a side view of a single base for the apparatus in accordance with a third embodiment of the present invention.
Figure 8:
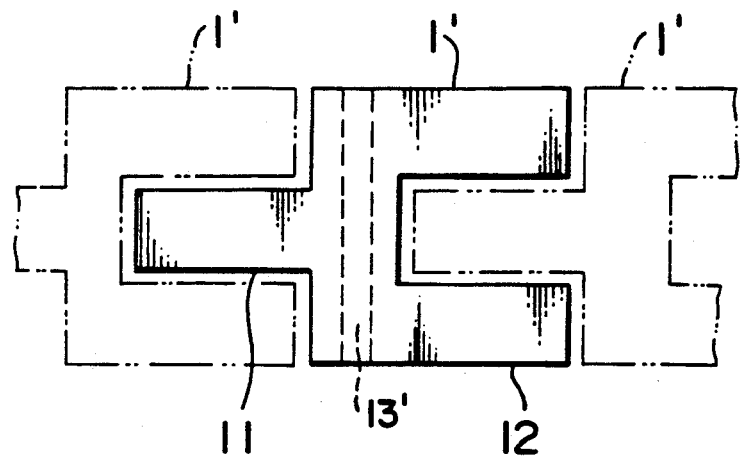
FIG. 8 is a plan view of the base shown in FIG. 7A.

Referring to FIG. 7B, depicting a third embodiment of the present invention, particularly in a case where it is difficult to form the shaft hole 13' in the same manner as the second embodiment of the present invention, a member 15 having a shaft hole 13'' formed therethrough is fixedly secured to the base 1'' at the substantially central part of the same base. However, operation of the apparatus is entirely analogous to that of the apparatus in accordance with the second embodiment of the present invention.

Either in a case where a plurality of bases are used for the apparatus in accordance with the second embodiment of the present invention or in a case where a plurality of bases are used for the apparatus in accordance with the third embodiment of the present invention, the apparatus is constructed in a similar manner the first embodiment of the present invention. However, when raising and lowering units each including and upper and lower limit stoppers are substituted for the raising and lowering units 7 and no coil spring is used for the apparatus, the controller 8 is activated to perform a controlling operation in such a manner that the base at the present stage is restored to the original position after the base at the subsequent stage is downwardly inclined as seen in the conveying direction of the roll 3.

Next, conveying operations of the apparatus will be described below.

When a roll 3 is held in an immovable state as shown in FIG. 1, when an operator gently pushes the roll 3 with his hands in the arrow-marked direction or the raising and lowering unit 7A are actuated by shifting another switch (not shown) to ON, the roll 3 starts to rotationally move on the base 1A at the first stage toward the base 1B at the second stage. As the roll 3 rotationally moves toward the base 1B at the second stage, the coil spring 6 is depressed by the dead weight of the roll 3 so that the base 1A is downwardly inclined as seen in the conveying direction of the roll 3. At this time, since the downstream side of the base 1B is upwardly inclined relative to the horizontal plane, a flattened V-shaped space is formed between the projection 11 of the base 1A and the bifurcated portion 12 of the base 1B so that the roll 3 stops at the bottom of the flattened V-shaped space. At this time, the actuator 5 attached to the lower surface of the projection 11 of the base 1A actuates the switch 4 to shift the same to ON. In response to a signal generated by the switch 4, the controller 8 is activated to drive the raising and lowering units 7 for the base 1B at the second stage. This causes the bifurcated portion 12 of the base 1B to be raised up, whereby the roll 3 rotationally moves on the base 1B toward the base 1C at the third stage. In this manner, when the roll 3 reaches the flattened V-shaped space between the adjacent bases, the controller 8 is activated to drive raising and lowering units at the subsequent stage, and at the same time, release the raising and lowering unit 7 at the preceding stage from an operative state. As a result, the base at the preceding stage is restored to the original inclined state so that the downstream side of the base is raised up.

In a case where either the base shown in FIG. 7A or the base shown in FIG. 7B is substituted for the aforementioned base, the roll is conveyed in a similar manner as mentioned above. However, in a case where raising and lowering units including upper and lower limit stoppers are substituted for the raising and lowering unit 7 without arrangement of the coil spring 6, the controller 8 is activated to perform a controlling operation in such a manner that raising and lowering units for the base at the preceding stage are lowered after the raising and lowering units for the base at the subsequent stage are raised up.

In such a manner, the roll 3 is rotationally displaced on a series of bases 1A, 1B, to, for example, 1F, at a slow speed until it is conveyed to a predetermined location such as a receiving/taking-out location, a wagon waiting location, a turn table or the like. It should be noted that when a previously conveyed roll 3 is present on a wagon or a turn table at a predetermined position, the controller 8 is activated in response to a signal transmitted from a sensor (not shown) to perform a controlling operation in such a manner that a base 1 at the final stage is kept in a standby state so that the conveyed roll 3 is immovably held on the base 1 at the final stage temporarily.

As is apparent from the above description, according to the present invention, each base is independently turnably displaced to turn about a corresponding fulcrum shaft, and a series of bases are successively joined to each other via fulcrum shafts so that the respective bases are successively pivoted. Thus, when the base at the preceding stage is pivoted, a flattened V-shaped space is formed between the base at the preceding stage and the base at the subsequent stage so that the conveyed roll stops at the bottom of the flattened V-shaped space. Thereafter, the roll starts its rotational displacement to allow it to be successively rotationally displaced on a series of bases at a slow speed without any acceleration.

While the present invention has been described above with respect to three preferred embodiments thereof, it should of course be understood that the present invention should not be limited only to these embodiments but various changes or modifications may be made without departure from the scope of the present invention as defined by the appended claims.

What is claimed is:

1. An apparatus for conveying a roll-shaped article on a conveyance path comprising;
   a plurality of flat plate-shaped bases arranged end-to-end in a direction in which said roll-shaped article is conveyed, each of said bases including: a projection on a downstream side thereof and a recess on an upstream side thereof for receiving a corresponding projection on an adjacent one of said plurality of bases; an upper smooth surface extending substantially parallel to a bottom surface of the base; and at least one fulcrum shaft hole, said fulcrum shaft hole being formed through the base;
   a plurality of fulcrum shafts, each transversely disposed through said at least one fulcrum shaft hole in a corresponding one of said plurality of bases, wherein each base is pivotably disposed to turn about a corresponding fulcrum shaft disposed through said at least one fulcrum shaft hole, said fulcrum shafts for linking said bases to form said conveyance path;
   a plurality of raising and lowering means, each disposed below a corresponding base to raise and lower said base;
   a plurality of load sensing means, each disposed below the downstream side of a corresponding base to sense a load on said base and to generate a load sensing signal indicative of said load; and
   a controller responsive to said load sensing signal to actuate raising and lowering means disposed below a base at a subsequent stage.

2. The apparatus as claimed in claim 1, wherein at least one of said raising and lowering means comprises an air bag.

3. The apparatus as claimed in claim 1, wherein said raising and lowering means is disposed below any one of said recesses and said base.

4. The apparatus as claimed in claim 3, wherein said raising and lowering member comprises a coil spring.

5. The apparatus as claimed in claim 1, wherein said load sensing means comprises a switch and an actuator for actuating said switch.

6. An apparatus for conveying a roll-shaped article on a conveyance path comprising;
   a plurality of flat plate-shaped bases arranged end-to-end in a direction in which said roll-shaped article is conveyed, each of said bases including: a projection on a downstream side thereof and a recess on an upstream side thereof for receiving a corresponding projection on an adjacent one of said plurality of bases; an upper smooth surface of each base extending substantially parallel to a bottom surface of the base; and at least one fulcrum shaft hole, said at least one fulcrum shaft hole being formed through a substantially central part of said base;

a plurality of fulcrum shafts, each transversely disposed through said at least one fulcrum shaft hole in a corresponding one of said plurality of bases, wherein each base is pivotably disposed to turn about the corresponding fulcrum shaft disposed through said at least one fulcrum shaft hole;

a plurality of raising and lowering means, each of said means disposed below a corresponding base to raise and lower said base;

a plurality of load sensing means, each disposed below the downstream side of a corresponding base to sense a load on said base and to generate a load sensing signal indicative of said load; and a controller responsive to a said load sensing signal to actuate raising and lowering means disposed below a base at a subsequent stage.

7. The apparatus as claimed in claim 6, wherein said raising and lowering means is disposed below any one of said recess and said projection of said base.

8. The apparatus as claimed in claim 7, wherein said raising and lowering member comprises a coil spring.

9. The apparatus as claimed in claim 6, wherein at least one of said raising and lowering means comprises an air bag.

10. The apparatus as claimed in claim 6, wherein said load sensing means comprises a switch and an actuator for actuating said switch.

11. The apparatus as claimed in claim 1, wherein at least one of said raising and lowering means comprises a fluid pressure actuating unit.

12. The apparatus as claimed in claim 11, wherein said fluid pressure actuating unit comprises a pneumatic cylinder.

13. The apparatus as claimed in claim 1, said projection comprising a slot for receiving a fulcrum shaft disposed through fulcrum shaft holes of an adjacent base.

14. The apparatus as claimed in claim 1, said apparatus further comprising two foundation frames disposed on opposite sides of said plurality of bases and disposed parallel to the direction in which said roll-shaped article is conveyed, said frames comprising receiving holes for receiving ends of said fulcrum shafts.

15. The apparatus as claimed in claim 1, said apparatus further comprising:

a sensor for indicating the presence of an article at a predetermined destination position and for generating a presence signal indicative thereof; wherein said controller keeps a base at a final stage of said apparatus in a standby state so that said roll-shaped article is temporarily maintained on that base.

16. The apparatus as claimed in claim 6, wherein at least one of said raising and lowering means comprises a fluid pressure actuating unit.

17. The apparatus as claimed in claim 16, wherein said fluid pressure actuating unit is a pneumatic cylinder.

18. The apparatus as claimed in claim 6, wherein at least one of said plurality of bases comprises a member on a side thereof, one of said at least one fulcrum hole being disposed therethrough.

19. The apparatus as claimed in claim 6, said apparatus further comprising two foundation frames disposed on opposite sides of said plurality of bases and disposed parallel to the direction in which said roll-shaped article is conveyed, said frames comprising receiving holes for receiving ends of said fulcrum shafts.

20. The apparatus as claimed in claim 6, said apparatus further comprising:

a sensor for indicating the presence of an article at a predetermined destination position and for generating a presence signal indicative thereof; wherein said controller keeps a base at a final stage of said apparatus in a standby state so that said roll-shaped article is temporarily maintained on that base.

* * * * *